United States Patent [19]

Jung et al.

[11] Patent Number: 4,874,157
[45] Date of Patent: Oct. 17, 1989

[54] METHOD FOR MINIMIZING MATERIAL UTILIZATION DURING SPREADING OF A MATERIAL WEB

[75] Inventors: Rolf Jung, Waiblingen; Albert Buss, Muensingen; Winfried Buchmann, Hemmingen, all of Fed. Rep. of Germany

[73] Assignee: Krauss u. Reichert GmbH & Co. KG Spezialmaschinenfabrik, Fellbach, Fed. Rep. of Germany

[21] Appl. No.: 180,520

[22] Filed: Apr. 12, 1988

[30] Foreign Application Priority Data

Apr. 16, 1987 [DE] Fed. Rep. of Germany ....... 3713010

[51] Int. Cl.$^4$ ............................................. B65H 29/46
[52] U.S. Cl. ...................................................... 270/30
[58] Field of Search .............................. 270/30, 31, 32; 264/270; 493/405, 937, 938

[56] References Cited

U.S. PATENT DOCUMENTS 3,769,488 10/1973 Hasslinger ............................ 364/470
4,583,181 4/1986 Gerber et al. ........................ 364/470

FOREIGN PATENT DOCUMENTS 3436231 4/1986 Fed. Rep. of Germany ........ 270/31
2023201 12/1979 United Kingdom .................. 270/31
2098752A 11/1982 United Kingdom ................ 364/470

Primary Examiner—Robert E. Garrett
Assistant Examiner—Therese M. Newholm
Attorney, Agent, or Firm—Kramer, Brufsky & Cifelli

[57] ABSTRACT

In order to improve a method for minimizing material utilization during spreading of a flawed material web, in particular, a fabric web, such that it can be carried out in a manner which always economizes on material or fabric, it is proposed that proceeding from a region determined by the flaw, a set of at least two virtual stop lines be placed in the pattern representation and all flawless pattern pieces cut by the virtual stop lines be determined, that by applying an optimization criterion which takes into consideration the flawless pattern pieces cut by the virtual stop lines and the flawed pattern pieces, one of the virtual stop lines be selected and the stop line be arranged at it, that a maximum distance from the stop line be determined which maximum distance corresponds to the furthest distance of a start of one of the flawless pattern pieces cut by the stop line or of one of the flawed pattern pieces from the stop line, and that the restart line be placed in the direction opposite to the spreading direction at least within the maximum distance from the stop line.

34 Claims, 3 Drawing Sheets

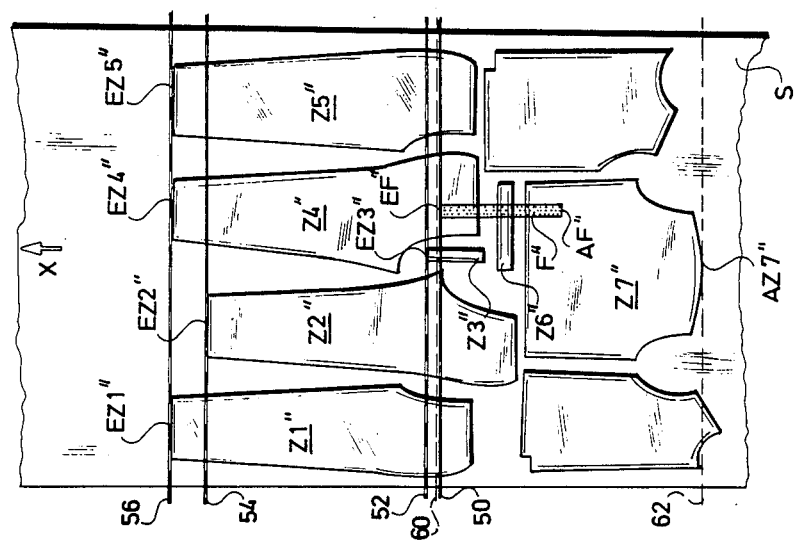
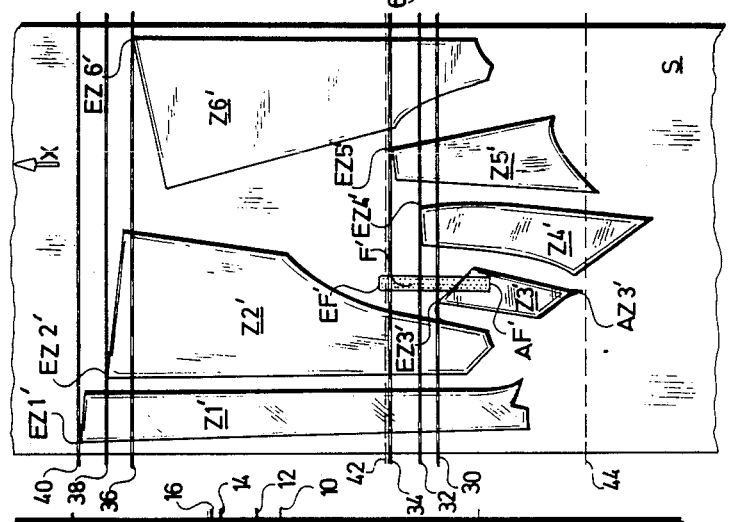
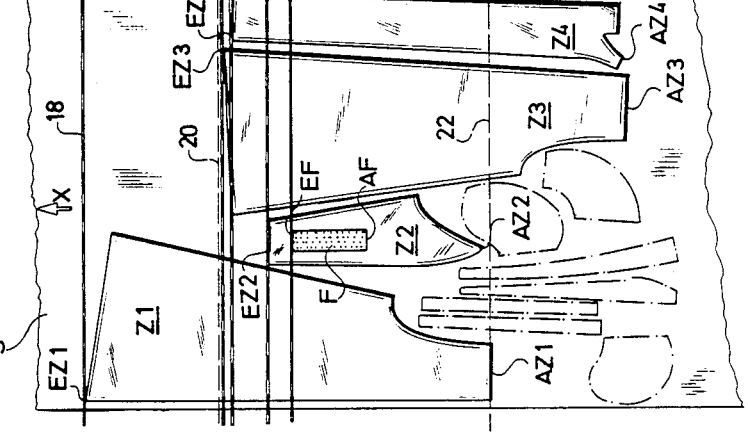

METHOD FOR MINIMIZING MATERIAL UTILIZATION DURING SPREADING OF A MATERIAL WEB

The invention relates to a method for minimizing material utilization during spreading of a flawed material web, in particular, a fabric web, wherein if the flaw falls in at least one pattern piece of a pattern, spreading is interrupted at a stop line extending transversely to the spreading direction over the entire width of the material web, the spreading machine is driven back from the stop line in the direction opposite to the spreading direction to a restart line parallel to the stop line, and spreading is continued from the restart line which is placed before a start of each of the flawed pattern pieces.

A spreading method in which it is determined whether the flaw falls in a pattern piece or beside the pattern in the waste is known. If the flaw lies in the pattern piece, spreading is interrupted at the stop line. The stop line is placed either so that it lies at a flaw end, in which case, the flaw is still in the spread layer, or so that it lies at a flaw start, in which case, the flaw is still in the material web which is yet to be spread. In the latter case, the flawed piece is usually cut out. The spreading machine is then driven back to an overlapping point.

In the methods known so far, a pattern representation usually has defined overlapping points which are determined by the layout of the pattern representation, more particularly, by a narrow waste strip extending transversely over the entire pattern representation at these defined overlapping points. Therefore—seen in the spreading direction—all pattern pieces of the pattern end before this overlapping point and a new array of pattern pieces begins after this overlapping point.

By driving back to the overlapping points fixed in the pattern representation, the respective flawed pattern piece is spread overlappingly and is, therefore, fully present in the subsequent cutting-out operation, damage to a flawless pattern piece located at the side of the flawed pattern piece as the fabric web is cut off at the stop line and incomplete spreading as it is spread overlappingly, resulting in part of this flawless pattern piece being missing in the subsequent cutting-out operation, being avoided.

The methods using overlapping points fixed by the pattern representation have the disadvantage that the pattern representation cannot always be designed in a optimal manner since it must always be ensured that the pattern representation contains an appropriate number of overlapping points. If, on the other hand, for example, a flaw occurs in only a small part, the spreading machine must often be driven back a long distance to the next overlapping point, which involves unnecessary material utilization.

Aside from these methods using overlapping points fixed by the pattern representation, methods are known in which the restart line is placed somewhere—seen in the spreading direction—before the start of the flawed piece. However, these methods lack strict criteria applicable in all cases for determining optimal positioning of the stop line and the restart line. In these methods, placing of the stop line and the restart line is left to the judgement of an operator who, in each case, decides freely according to his own estimation.

These methods have the disadvantage that the saving in fabric depends on the experience and skill of the operator. There is also the possibility that the operator may damage pattern pieces when cutting the material web off at the stop line, fail to detect this immediately and then not spread these pattern pieces fully together with the flawed pattern piece, in which cases these pattern pieces are missing afterwards. This method also has the disadvantage that the operator partly requires a considerable amount of time to fix stop and restart lines as there is no standard to follow. Finally, lack of standardization makes it impossible for this method to be carried out automatically, whether by a well-trained operator or a correspondingly controlled machine.

The object underlying the invention is, therefore, to so improve a method of the generic kind that it can be performed in a manner which economizes on material or fabric.

This object is accomplished, in accordance with the invention, in a method of the kind described at the beginning in that proceeding from a region determined by the flaw, a set of at least two virtual stop lines is placed in the pattern representation and all flawless pattern pieces cut by the virtual stop lines are determined, in that by applying an optimization criterion which takes into consideration the flawless pattern pieces cut by the virtual stop lines and the flawed pattern pieces, one of the virtual stop lines is selected and the stop line is arranged at it, in that a maximum distance from the stop line is determined which maximum distance corresponds to the furthest distance of a start of one of the flawless pattern pieces cut by the stop line or of one of the flawed pattern pieces from the stop line, and in that the restart line is placed in the direction opposite to the spreading direction at least within the maximum distance from the stop line.

This inventive method has the advantage that the fixed optimization criterion enables the operator to always proceed in the same way and to choose from the set of virtual stop lines that which is most suitable. This method also has the advantage that once a stop line has been chosen—independently of where this stop line lies—it is always ensured that the restart line is set back relative to the stop line so far in the direction opposite to the spreading direction that none of the flawless pattern pieces is damaged by the stop line and then incompletely spread in the overlapped spreading procedure. Therefore, even independently of optimization of the position of the stop line, it is ensured that each spread layer contains all of the pattern pieces in their entirety, if necessary, with an overlappingly spread piece.

This inventive method assumes that the material or fabric web is spread by, example, a spreading machine which is only capable of approaching stop lines and restart lines arranged perpendicularly to a spreading direction and, therefore, both the stop lines and the restart lines extend approximately perpendicularly to the spreading direction transversely over the entire width of the material web and, consequently, when the material web is cut off near the stop line, it is severed throughout its entire width.

The set of virtual stop lines may be optionally selected for the inventive method. However, since each virtual stop line must be examined on the basis of the optimization criterion, the number of virtual stop lines should not be infinitely large. It is, for example, conceivable to arrange the virtual stop lines over a certain distance in the spreading direction and in the opposite direction in constantly spaced relation to each other and to examine them on the basis of the optimization criterion. However, since it can be assumed that the material web can usually be spread until the flaw occurs, the virtual stop lines can be advantageously reduced by the set of virtual stop lines being so positioned that a first one lies in the region of the flaw and further ones in spaced relation thereto in the spreading direction.

It is, for example, conceivable, proceeding from a region of the flaw, to arrange stop lines at predetermined distances from one another in the spreading direction. This could yield satisfactory results if the pattern representation had only a few different pattern pieces which are repeated at short distance from one another and so the distances between the virtual stop lines could be predetermined in accordance with a size and a repetitive spacing of the pattern pieces. However, the inventive method can be used much more advantageously and above all, universally without having to take into consideration the pattern on which it is based, if in order to position the virtual stop lines, a start line is placed in the region of the flaw, the flawless pattern pieces cut by the start line are determined and the further virtual stop lines are placed at one end of one of these pattern pieces, in each case. This particularly preferred embodiment of the inventive method minimizes the number of virtual stop lines to be provided in the set by placing in compliance with the respective pattern representation virtual stop lines only at those points at which there is any prospect at all of achieving minimization of the material used. Accordingly, in this embodiment, proceeding from a first virtual stop line in the region of the flaw, further virtual stop lines are progressively placed in the spreading direction at all the ends of the flawless pattern pieces cut by the starting line so that it can be examined afterwards on the basis of the optimization criterion whether it saves more fabric to fully spread one or even several of the flawless pattern pieces and to place the stop line only after these spread pattern pieces and to then determine from it, in accordance with the embodiments described above, the restart line.

If provision is made—as in an improved version of the embodiment described above—for the further virtual stop lines to be placed in the spreading direction at a short distance from the ends of the pattern pieces, this results in a slight increase in material utilization, but this disadvantage is balanced by the advantage that the respective pattern pieces cannot be damaged at their edges in, for example, a cutting-off operation at the stop line. This is particularly important if a certain measurement error should occur in the course of time during spreading in the spreading direction.

In a particularly simple version of the inventive embodiment described above, provision is made for the first virtual stop line and the start line to coincide. This reduces the work involved in fixing the virtual stop lines. With more complicated patterns, on the other hand, it may be more advantageous for the start line and the first virtual stop line to be placed separately from each other.

With regard to the relative position of the start line and the first virtual stop line, it is advantageous for the first virtual stop line—seen in the spreading direction—to follow the start line.

In the embodiments described so far, it was not specified how the first virtual stop line is to be placed relative to the flaw. It was merely stated that it is to be placed in the region of a flaw. In a variant of the inventive method which economizes particularly well on fabric, provision is made for the first virtual stop line to be placed in accordance with a selection criterion either near a flaw end or near that end of a flawed piece which is closest to the flaw end. In other words, two locations are provided in the region of the flaw which represent a particularly expedient position for the first virtual stop line.

This particularly advantageous version should, however, not exclude other simpler procedures in accordance with the inventive method in which the first virtual stop line is always placed near the flaw end.

In the fixing of the virtual stop line at one of the abovementioned locations as explained above, it is expedient for the selection criterion for the flaw end to be fulfilled when the flaw end is located in a pattern piece. In other words, when the flaw end is located in a pattern piece, the first virtual stop line is then also always placed near this flaw end. In all other cases, in particular, where the flaw end lies in the waste, i.e., outside of a pattern piece, the first virtual stop line is then placed near the end of the closest flawed piece.

In the placing of the first virtual stop line, it has also proven expedient for the first virtual stop line to be placed at a short distance from the flaw end in the spreading direction.

In the embodiments of the inventive method described so far, only particularly preferred and expedient embodiments defining placement of the virtual stop lines have been explained. Further details of the optimization criterion have not yet been given. In principle, this optimization criterion can be based on a number of parameters. For example, it is conceivable, in the case of patterned fabrics, for the optimization criterion to be based on the relative position of the pattern of the fabric web to be spread in relation to the individual pattern pieces, if it is necessary for the respective pattern pieces to begin at a particular point of the pattern in the fabric web to be spread. Without excluding such an optimization criterion, it is expedient, in most cases, for the extent of the flawless pattern pieces cut by the respective virtual stop line and of the flawed pattern pieces in the direction opposite to the spreading direction to be taken into account in the optimization criterion. If as much fabric as possible is to be saved during spreading, this criterion has priority over the optimization criterion being based on the fabric pattern, at least in the case of fabrics having only one color and small patterns. However, the last optimization criterion mentioned above constitutes a further expedient and purposeful supplement in the case of patterned fabrics.

An embodiment of the inventive method has proven particularly advantageous wherein the maximum distance between the set of virtual stop lines and the virtual restart lines pertaining to these is taken into consideration in the optimization criterion, the maximum distances being determined as in the case of actual stop lines. In this preferred embodiment, in other words, the optimization criterion is always based on the measurement of the maximum distance proceeding from each virtual stop line.

However, this does not exhaust all possibilities for determining the optimization criterion. The material utilization can be further minimized by the extent of the flaw between a flaw start and a flaw end being taken into consideration in the optimization criterion since there are situations where further spreading of a flawed material web is not detrimental owing to, for example, the flaw falling within the waste. In many cases, this results in an additional saving of material.

In one possible procedure for taking the extent of the flaw into consideration, the extent of the flaw in the spreading direction from the respective virtual stop line to the flaw end is determined and added to the respective maximum distance of this virtual stop line as addition. Hence in all embodiments of the inventive method with the possibility of placing the first virtual stop line and, where appropriate, also further virtual stop lines before the flaw end, if one of these virtual stop lines lying before the flaw end is selected, the possibility of the material web being cut off at the selected stop line and placed at the restart line with a remainder of the flaw still in it and then being incorporated in a pattern piece again is excluded.

However, the adding of an addition to the maximum distance fails to take into account all cases where it is acceptable for a piece of the flaw to still be in the material web placed at the restart line because it falls within the waste after spreading has been continued at the restart line. For this reason, provision is made in a further refinement of the inventive method for the difference between the maximum distance and the largest distance from the start of one of the flawed pattern pieces to be subtracted again from the addition and, if the addition is greater than zero, for it to then be added to the maximum distance. Hence a further saving of fabric which is adapted to these special situations is possible.

Taking into consideration some or all of the above-explained parameters which are taken into account in the optimization criterion, the simplest selection procedure for determining the virtual stop line with which the actual stop line is to be identical, is for the maximum distance, possibly also taking the addition into consideration, to be determined for all virtual stop lines and for the optimization criterion to be fulfilled for that virtual stop line whose associated restart line exhibits the smallest maximum distance.

In the embodiments of the inventive method described so far, provision is made for the material web to be cut off, in particular, at the stop line, before being placed at the restart line. This procedure does, however, constitute only one of several possibilities. For example, it is similarly possible for the material web to be laid in the form of a fold between the stop line and the restart line in the direction opposite to the spreading direction. It could be at first glance be assumed that this procedure results in greater material utilization. However, this need not necessarily be the case as it is, for example, conceivable for the fold to be laid so as to harbor the flaw. In order for such a case to be taken into account in the optimization criterion, it is, of course, necessary for the first virtual stop line to be placed in the region of a flaw start so that when the optimization criterion is being checked, spreading in the form of a fold can also be taken into account. It likewise lies within the scope of the inventive method to offer cutting-off of the material web at the stop line or laying of a fold between the stop line and the restart line as alternatives and to decide between these two alternatives on the basis of the optimization criterion into which the extent of the flaw in the spreading direction can be incorporated. The advantage of laying a fold can be seen in the fact that cutting-off of the material web at the stop line can then be dispensed with, this being at least time consuming.

The inventive method described above can be further optimized by the pattern representation including in addition to the contour of the pattern pieces information on the regions of the pattern pieces to be kept free from flaws, and only if the flaw falls within this region of the pattern pieces, is spreading interrupted, the spreading machine driven back to the restart line and spreading continued from the restart line. These additional method steps make it possible, for example, for spreading not to be interrupted when the flaw falls within the region of a seam allowance of a pattern piece or of a pattern piece forming the underside of a collar as the flaw is not troublesome in these regions if it is, for example, a stain or a weaving flaw. Even if the flaw is a tear or a hole, this is still acceptable at least within part of the seam allowance and, therefore, spreading can be continued in all of these cases.

The regions to be kept free from flaws can be defined by very different criteria. It is, for example, possible to take into account in these criteria the point at which this region of the pattern piece occurs in the finished article of clothing. The simplest criterion for determining the regions to be kept free from flaws is based on the regions of the pattern pieces to be kept free from flaws being those regions of the pattern pieces which are normally visible in an article of clothing made from these pattern pieces.

A further improvement and optimization of the inventive method is possible by recording for each flaw additional data enabling the flaw to be assigned to additional categories and for spreading only to be interrupted, the spreading machine driven back to the restart line and spreading continued from there if a flaw of a predetermined category falls within a predetermined region of one of the pattern pieces. Assignment of the flaws to different categories enables, for example, such flaws as holes or tears to be treated differently than, for example, weaving flaws or stains. The latter may, for example, be acceptable without hesitation at all points which are not visible in the finished article of clothing, whereas a hole or a tear, for example, on the underside of a collar is not acceptable, but a hole or a tear at least within part of a seam allowance might be acceptable. Hence it is also possible to divide the pattern pieces up into different regions which in conjunction with respectively predeterminable flaw categories result in spreading being interrupted, whereas spreading can be continued if a flaw of another non-critical category falls in such a region of a pattern piece.

Finally, the inventive method can be further refined by the pattern representation containing, in addition to the contour of the pattern pieces, data on the further working on an article of clothing made from the pattern pieces after sewing and for it to be stipulated on the basis of these data in which flaw category spreading is interrupted, the spreading machine driven back to the restart line and spreading continued from there. Hence flaws can be recorded which, for example, are oil or soiled spots which after further working on the finished article of clothing in the form of for example, dying, shrinking, napping, etc. are of no significance, whereas holes or tears or even weaving flaws still remain visible after such further working steps.

The present invention further relates to an automatic control system for a fabric spreading machine which is designed and configured to control or carry out the method according to one or several of the above-described embodiments in accordance with the claims.

Further features and advantages of the inventive method are to be found in the following description and the appended drawings of some embodiments. In the drawings:

FIG. 2 is a typical pattern representation depicting a first flaw situation;

FIG. 3 is a typical pattern representation depicting a second flaw situation;

FIG. 4 is a typical pattern representation depicting a third flaw situation.

A preferred embodiment of an inventive method proceeds from a situation in which a spreading machine has detected a flaw in a fabric web as it is being spread out on a spreading table, either in a portion which has already been spread out or in a portion which is to be spread out.

Figure 1:
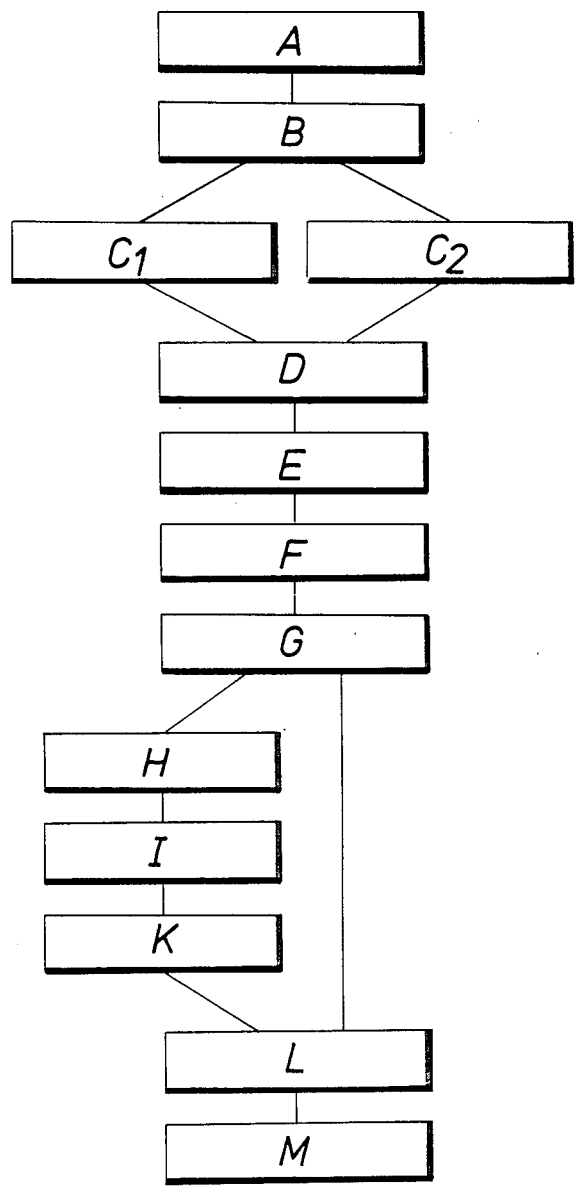
FIG. 1 is a flow chart representing an embodiment of the inventive method.

The procedure will be explained below with reference to the flow chart of FIG. 1:

In step A, in accordance with the inventive method, the location of the flaw is established by determining a flaw start and a flaw end, i.e., the extent of the flaw in the spreading or X-direction. The location of the flaw transversely to the spreading or X-direction, i.e., in the Y-direction, is also established. On the basis of these X and Y coordinates of the flaw start and the flaw end, a comparison is made with a pattern representation stored or readable on another device. If both the flaw start and the flaw end are found to lie with their X and Y coordinates in the waste, i.e., between several pattern pieces, spreading is immediately continued, i.e., the inventive method is not carried out.

If at least the flaw start or the flaw end or both the flaw start and the flaw end are found to lie in one or several of the pattern pieces, these flawed pattern pieces are determined in accordance with the inventive method.

In the following step B, the operator examines again whether the flaw end lies in a pattern piece or in the waste. If the flaw end lies in the waste, step C 1 is carried out. In step C 1, a start line is placed approximately at the end of a flawed pattern piece located closest to the flaw end in the direction opposite to the spreading direction. If, however, the flaw end lies within a pattern piece, step B is then followed by step C 2. In step C 2, the start line is placed at the flaw end.

This start line forms the basis for the subsequent inventive method. In step D, those pattern pieces which are cut by the start line, i.e., those pattern pieces lying on either side of the flaw at the same level as the flaw in the fabric web are determined. Virtual stop lines are then placed at a short distance from the start line and from respective ends of the pattern pieces cut by the start line. Ends within the meaning of the inventive method are those points of the respective pattern pieces which define the maximum extent of these pattern pieces in the X-direction. Starts of pattern pieces are all of those points of the pattern pieces which define the maximum extent of the pattern pieces in the direction opposite to the spreading direction.

These virtual stop lines and the start line extend substantially perpendicularly to the spreading direction transversely over the entire width of the fabric web. In accordance with the inventive method, all of the flawless pattern pieces cut by each virtual stop line are determined in step E. In step F, likewise proceeding from each virtual stop line, the starts of the flawless pieces cut by it and also the starts of all pieces which are flawed (by the flaw under consideration or the group of flaws treated as one flaw) are determined. The flawed pieces do, of course, not have to be cut by the virtual stop line but rather are fixed absolutely and independently of the location of the virtual stop lines by the location of the flaw as determined in steps A and B.

In step G, that start which is located furthest from each virtual stop line in the direction opposite to the spreading direction is then determined. This may be both a start of a cut, flawless pattern piece and a start of a flawed pattern piece. After this start which is located furthest from the virtual stop line has been determined, the maximum distance from the stop line corresponding to this start is also established.

If in the previous step B, the flaw end was found to lie in the waste and, therefore, the start line was fixed in accordance with step C 1, step G is then followed by step H. In this step, all virtual stop lines which lie before the flaw end in the spreading direction are determined and, proceeding from the respective virtual stop line located before the flaw end, the size of the flaw extending in the spreading direction is established. The thus determined extent of the flaw constitutes an addition.

In accordance with step I, the addition undergoes correction in that in addition to the respective maximum distance of the respective virtual stop line, the distance of the latter from the start of a flawed piece located furthest from the virtual stop line is determined. The difference between these is subtracted from the addition and this results in a corrected addition value. In step K, this corrected addition value, if positive, is then added to the maximum distance of the respective virtual stop line located before a flaw end.

Step L follows either step K or step G if it was previously determined in step B that the flaw end lies in a pattern piece and the start line was placed in accordance with step C 2. Step L represents the actual application of the inventive optimization criterion. In step L, proceeding from all maximum distances established and, where appropriate, corrected, in the previous steps, for the respective virtual stop lines, the smallest maximum distance is determined. The virtual stop line pertaining to this smallest maximum distance is selected and the actual stop line is placed so as to coincide with this selected virtual stop line.

In the last step M of the inventive method, proceeding from this actual stop line whose maximum distance is likewise known, a restart line is placed in the direction opposite to the spreading direction at a distance which is at least equal to the maximum distance pertaining to this stop line. Spreading of the fabric web is then started again at this restart line and continued in the usual manner in the spreading direction.

In the inventive method, the fabric web is preferably cut off at the stop line so that spreading can be started again with the cut edge at the restart line.

The procedure in accordance with the inventive method schematically illustrated in the flow chart of FIG. 1 will be explained in greater detail below with reference to three different flaw situations.

FIG. 2 shows a section of a typical pattern representation with fabric pieces Z 1 to Z 4. In accordance with this pattern representation, whole stacks of pattern pieces Z 1 to Z 4 can be cut out later from a pile of layers which has been spread out.

If an operator or a spreading machine detects in a fabric web S spread in the spreading direction, generally designated X-direction, after steps A and B have been carried out, that a flaw F falls with both a start AF and an end EF in pattern piece Z 2, then in accordance with step C 2 a start line 10 is placed transversely over the entire fabric web S at the flaw end EF.

In accordance with step D, it is then determined which pattern pieces are cut by this start line 10. These are the flawless pattern pieces Z 1, Z 3 and Z 4 and also the flawed pattern piece Z 2. Then all ends EZ 1 to EZ 4 of these pattern pieces Z 1, Z 2, Z 3 and Z 4 are determined. In the described preferred embodiment of the inventive method, the virtual stop lines are placed such that the first virtual stop line coincides with the start line. Accordingly, the following virtual stop lines are placed in the pattern representation. The first virtual stop line coincides with start line 10, The second virtual stop line 12 lies in the spreading direction at a short distance from end EZ 2 of the flawed piece Z 2. The third virtual stop line 14 lies at a short distance from the end of pattern piece Z 4. The fourth virtual stop line 16 lies at a short distance in the spreading direction from end EZ 3 of pattern piece Z 3 and the fifth virtual stop line 18 lies at a short distance from end EZ 1 of pattern piece Z 1.

In accordance with step E, all flawless pieces cut by the virtual stop lines 10 to 18 are then determined. In the case of virtual stop line 10 and virtual stop line 12, these are pattern pieces Z 1, Z 3 and Z 4, in the case of the third virtual stop line 14, pattern pieces Z 3 and Z 1, in the case of the fourth virtual stop line 16, only pattern piece Z 1 and in the case of the fifth virtual stop line 18 no pattern pieces at all.

In accordance with step F, all starts of the flawless pieces cut by each virtual stop line and all starts of all flawed pieces are then determined. These are, for example, in the case of the first virtual stop line 10, starts AZ 1 of the first pattern piece, AZ 2 of the flawed pattern piece, AZ 3 of pattern piece Z 3 and AZ 4 of pattern piece Z 4. For each virtual stop line 10 to 18, that start which exhibits a maximum distance from this particular virtual stop line 10 to 18 is then selected. This is start AZ 3 in the case of virtual stop line 10 and also in the case of virtual stop line 12, in the case of virtual stop line 14 it is likewise start AZ 3, in the case of virtual stop line 16, start AZ 1 and in the case of virtual stop line 18, start AZ 2.

Since in the pattern representation according to FIG. 2, the flaw end lies in a pattern piece and hence step B was followed by step C 2, the next step is step L. This means that all maximum distances of all virtual stop lines 10 to 18 are compared with one another and the smallest maximum distance is determined. This is the maximum distance pertaining to virtual stop line 16, i.e., the distance between virtual stop line 16 and start AZ 1 of pattern piece Z 1. Hence an actual stop line 20 is placed at the location of virtual stop line 16 and a restart line 22 is placed in the direction opposite to the spreading direction at a distance corresponding to at least the maximum distance between virtual stop line 16 and start AZ 1 of pattern piece Z 1.

In accordance with step M, fabric web S is now severed over its entire width at stop line 20 and its cut edge is placed at restart line 22 and spreading continued in the usual manner.

In a second flaw situation, illustrated in FIG. 3, the flaw F' lies with its flaw start AF' in pattern piece Z 3' but its flaw end EF' outside of pattern piece Z 3' in the waste.

Accordingly, steps A and B are followed by step C 1, i.e., start line 30 is placed at the nearest end of a flawed pattern piece, in this case, at end EZ 3' of flawed pattern piece Z 3'.

Proceeding from this, in the described embodiment of the inventive method, the first virtual stop line also lies at the location of start line 30, the second virtual stop line 32 at end EZ 4', the third virtual stop line 34 at end EZ 5', the fourth virtual stop line 36 at end EZ 6', the fifth virtual stop line 38 at end EZ 2' and the sixth virtual stop line 40 at end EZ 1'.

The respective maximum distance is then determined for these virtual stop lines 30 to 40. However, since this is a case where flaw end EF' lies in the waste, step G is followed by steps H to K. Accordingly, there is added to the maximum distances calculated for stop lines 30 to 34 located before flaw end EF', the extent of flaw F' from the respective stop line 30 to 34 to the flaw end EF' as addition and, in turn, the difference between the maximum distance of each stop line 30 to 34 and the distance from the furthest start of a flawed piece, in this case, start AZ 3', is subtracted, and only if this addition is positive, is it added on.

In other words, in the case of virtual stop line 30, the full extent of the flaw from this stop line 30 to flaw end EF' is added on, in the case of virtual stop line 32 the extent of the flaw from it to flaw end EF' is added on, but, in addition, the difference between start AZ 5' and start AZ 3' is subtracted, and in the case of virtual stop line 34, the extent of the flaw from it to flaw end EF' must be added on. Taking these additions into account, it is virtual stop line 34 which exhibits the smallest maximum distance, the short extent of the flaw from this stop line to flaw end EF' being added to this. Accordingly, stop line 42 is placed at the location of virtual stop line 34 and restart line 44 is set back in the direction opposite to the spreading direction by at least the maximum distance of stop line 34 which is comprised of the distance of start AZ 3' from virtual stop line 34 and the extent of the flaw to flaw end EF' from this virtual stop line 34.

In a third flaw situation, illustrated in FIG. 4, the flaw F" extends from its start AF" to its end EF" over several pattern pieces, namely over pattern pieces Z 7", Z 6" and Z 4".

Since the flaw end EF" lies in pattern piece Z 4", the sequence of steps A, B, C 2 is applicable, i.e., start line 50 lies at flaw end EF". The first virtual stop line is then likewise placed at the location of start line 50, the second virtual stop line 52 at end EZ 3", the third virtual stop line 54 at end EZ 2" and the fourth virtual stop line 56 at ends EZ 1", EZ 4" and EZ 5". In determining the maximum distance in accordance with steps D to G, it is important to take into consideration not only the flawed pattern piece in which the flaw end is located but rather all flawed pattern pieces, i.e., also pattern pieces Z 6" and Z 7".

As shown in FIG. 4, flawed piece Z 7" must, in any case, be spread out again. Therefore, in determining the maximum distances, proceeding from all virtual stop lines 50 to 56, start AZ 7" is always furthest away. Accordingly, the smallest maximum distance is the distance between virtual stop line 50 and start AZ 7". Therefore, the actual stop line 60 is placed at the location of virtual stop line 50 and restart line 62, proceeding from stop line 50, is set back at least by the maximum distance in the direction opposite to the spreading direction and so restart line 62, seen in the spreading direction, is located before start AZ 7''.

In accordance with step M, the fabric web can then be cut off at stop line 60 and spreading started again at restart line 62.

Accordingly, a preferred embodiment of the inventive method for minimizing material utilization during spreading of a material web containing one of several flaws, in which spreading of the material web is interrupted if the flaw falls in a pattern piece of the pattern and the material web is cut off at a cutting line extending transversely over its width, the spreading machine is then driven back from this cutting line in the direction opposite to the spreading direction to a parallel restart line before the start of the flawed piece which is furthest away in the direction opposite to the spreading direction, and spreading is continued from this restart line, is characterized in that in the spreading direction, at the flaw end or if several flaws which lie together are simultaneously treated as one flaw, at the flaw end of that flaw which extends furthest in the spreading direction, an imaginary cutting line is drawn transversely through the pattern representation, and in that further imaginary cutting lines determined by the ends of the flawless pieces affected by the first imaginary cutting line are drawn, and in that all of the pieces affected by all imaginary cutting lines are examined as to whether the cutting-off line is to be placed at the flaw end or in the spreading direction at the end of one of the flawless, examined pieces, in order to determine the minimum distance from the restart line and hence the minimum material overlap, yet ensuring that all flawed pieces are covered with flawless material.

Figure 5:
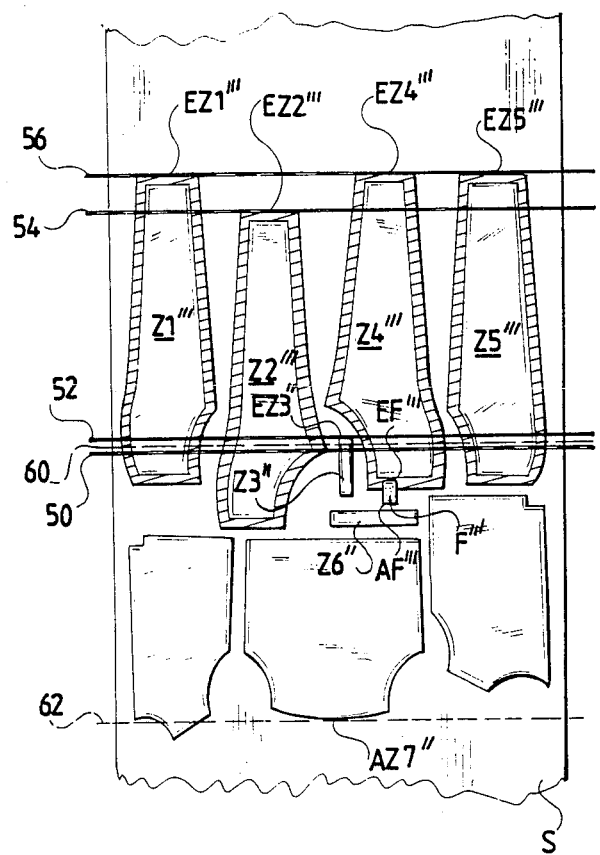
FIG. 5 is a pattern representation depicting a flaw situation similar to that of FIG. 4.

In addition to the procedure described above, further optimization of the inventive method is possible by taking into consideration in addition to the outer contour of pattern pieces Z 1''', Z 2''', Z 4''' and Z 5''', the seam allowance included in these pattern pieces which is indicated by hatching in pattern pieces Z 1''' to Z 5''' of FIG. 5. Assuming that flaw F''' is a weaving flaw or a solid spot, there is no necessity—although flaw F''' falls partly in pattern piece Z 4'''—to interrupt spreading since a weaving flaw or a soiled spot can be accepted without hesitation in the seam allowance of pattern piece Z 4''' and will not be visible later in an article of clothing made from this pattern piece Z 4''', in this case, a pair of trousers.

Only if flaw F''' extended beyond the seam allowance of pattern piece Z 4''' into the part of pattern piece Z 4''' which is not hatched in FIG. 5, would it be necessary to interrupt spreading in accordance with the inventive method and carry out the optimization steps described above.

If, however, flaw F''' were a hole, this would not be acceptable even if it lay in the seam allowance of pattern piece Z 4''' indicated by hatching in FIG. 5, since a hole extending as far as a seam which is to be made later would impair the stability of the seam and hence also the article of clothing made from this pattern piece Z 4'''.

Accordingly, if F''' were a hole, spreading would have to be interrupted and the inventive method carried out.

What is claimed is:

1. A method for minimizing material utilization during spreading of a flawed material web, in particular a fabric web, wherein if the flaw falls in at least one pattern piece of a pattern the following steps are executed:
   (a) proceeding from a region determined by said flaw, placing a set of at least two virtual stop lines extending transversely to the spreading direction over the entire width of said material web according to predefined criteria in the pattern representation and all the flawless pattern pieces cut by said virtual stop lines are determined;
   (b) applying an optimization criterion for minimizing material utilization which takes into consideration the flawless pattern pieces cut by said virtual stop lines and the flawed pattern pieces and selecting the one of said virtual stop lines resulting in a minimum waste of material;
   (c) interrupting the spreading at said selected stop line;
   (d) determining a maximum distance from said stop line which maximum distance corresponds to the furthest distance of a starting point of one of said flawless pattern pieces cut by said stop line or of one of said flawed pattern pieces from said stop line;
   (e) placing a restart line parallel to said stop line in the direction opposite to the spreading direction at least within the maximum distance from said stop line;
   (f) driving the spreading machine back from said stop line in the direction opposite to the spreading direction to said restart line; and
   (g) continuing spreading from said restart line.

2. A method as defined in claim 1, characterized in that said set of virtual stop lines is positioned such that a first virtual stop line is located in the region of said flaw and further virtual stop lines at a distance from said first virtual stop line in the spreading direction.

3. A method as defined in claim 2, characterized in that in order to position said virtual stop lines, a start line is placed in the region of said flaw, in that the flawless pattern pieces cut by said start line are determined, and in that the further virtual stop lines are placed at one end of one of these pattern pieces, in each case.

4. A method as defined in claim 3, characterized in that said further virtual stop lines are placed at a short distance from said ends of said pattern pieces in the spreading direction.

5. A method as defined in claim 3, characterized in that said first virtual stop line and said start line are made to coincide.

6. A method as defined in claim 3, characterized in that said first virtual stop line, seen in the spreading direction, follows said start line.

7. A method as defined in claim 2, characterized in that in accordance with a selection criterion, said first virtual stop line is placed either near a flaw end or near that end of a flaw piece which is located closest to said flaw end.

8. A method as defined in claim 7, characterized in that said selection criterion for said flaw end is fulfilled when said flawed end is located in a pattern piece.

9. A method as defined in claim 2, characterized in that said first virtual stop line is placed at a short distance from said flaw end in the spreading direction.

10. A method as defined in claim 1, characterized in that the extent of said flawless pattern pieces cut by the respective virtual stop line and of said flawed pattern pieces in the direction opposite to the spreading direction is taken into account in the optimization criterion.

11. A method as defined in claim 10, characterized in that the maximum distances between said set of virtual stop lines and the virtual restart lines associated with said virtual stop lines are taken into account in the optimization criterion, said maximum distances being determined as in the case of actual stop lines.

12. A method as defined in claim 10, characterized in that the extent of said flaw between a flaw start and a flaw end is taken into account in the optimization criterion.

13. A method as defined in claim 12, characterized in that the extent of said flaw in the spreading direction from the respective virtual stop line to said flaw end is determined and added to the respective maximum distance as addition.

14. A method as defined in claim 13, characterized in that the difference between the maximum distance and the largest distance from the start of one of said flawed pattern pieces is subtracted again from said addition and only if said addition is greater than zero is it added to said maximum distance.

15. A method as defined in claim 11, characterized in that the optimization criterion is fulfilled for that virtual stop line whose associated restart line exhibits the smallest maximum distance.

16. A method as defined in claim 1, characterized in that said material web is cut off before being placed at said restart line.

17. A method as defined in claim 16, characterized in that said material web is cut off at said stop line.

18. A method as defined in claim 1, characterized in that said material web is laid in the form of a fold in the direction opposite to the spreading direction between said stop line and said restart line.

19. A method as defined in claim 1, characterized in that said material web is cut off and set down fully automatically.

20. A method as defined in claim 1, characterized in that said material web is cut off at the flaw end (in the spreading direction) and is set down again before that pattern piece which is affected by the cutting line and extends furthest in the direction opposite to the spreading direction.

21. A method as defined in claim 1, characterized in that the cutting line is placed at the end (in the spreading direction) of the flawed piece.

22. A method as defined in claim 1, characterized in that the cutting line is placed at the end of one of the pattern pieces which extends beyond the flawed pattern piece in the spreading direction.

23. A method as defined in claim 1, characterized in that the cutting line is placed in the spreading direction either at the end of said flawed pattern piece or at the end of one of the pattern pieces which extend beyond said flawed pattern piece in the spreading direction.

24. A method as defined in claim 1, characterized in that the cutting and restart lines are placed such that said flawed pattern piece is covered.

25. A method as defined in claim 1, characterized in that the cutting and restart lines are placed such that all pattern pieces severed by the cutting line including said flawed pattern piece are covered.

26. A method as defined in claim 1, characterized in that the cutting and restart lines are placed such that while eliminating the flaw, the shortest possible distance is created between cutting and restart lines.

27. A method as defined in claim 1, characterized in that in addition to the contour of the pattern pieces, the pattern representation contains information concerning the regions of the pattern pieces which are to be kept free from flaws, and in that only if the flaw is located in this region of the pattern pieces is spreading interrupted, the spreading machine driven back to the restart line and spreading continued from there.

28. A method as defined in claim 27, characterized in that the regions of the pattern pieces which are to be kept free from flaws are those regions of the pattern pieces which are normally visible in an article of clothing made from these pattern pieces.

29. A method as defined in claim 27, characterized in that additional data are recorded for each flaw to enable assignment of said flaw to additional categories, and in that only if a flaw of a predetermined category falls within a predetermined region of one of said pattern pieces is spreading interrupted, the spreading machine driven back to the restart line and spreading continued from there.

30. A method as defined in claim 29, characterized in that in addition to the contour of the pattern pieces, the pattern representation contains data on the further working on an article of clothing to be made from the pattern pieces after sewing of said article of clothing, and in that it is determined on the basis of these data in which flaw category spreading is interrupted, the spreading machine is driven back to the restart line and spreading is continued from there.

31. A method as defined in claim 4, characterized in that said first virtual stop line and said start line are made to coincide.

32. A method as defined in claim 4, characterized in that said first virtual stop line, seen in the spreading direction, follows said start line.

33. A method as defined in claim 11, characterized in that the extent of said flaw between a flaw start and a flaw end is taken into account in the optimization criterion.

34. A method as defined in claim 28, characterized in that additional data are recorded for each flaw to enable assignment of said flaw to additional categories, and in that only if a flaw of a predetermined category falls within a predetermined region of one of said pattern pieces is spreading interrupted, the spreading machine driven back to the restart line and spreading continued form there.

* * * * *